Aug. 8, 1967  L. G. OLAVSON  3,334,819
GAS DIFFUSION APPARATUS
Filed March 31, 1966  4 Sheets-Sheet 1
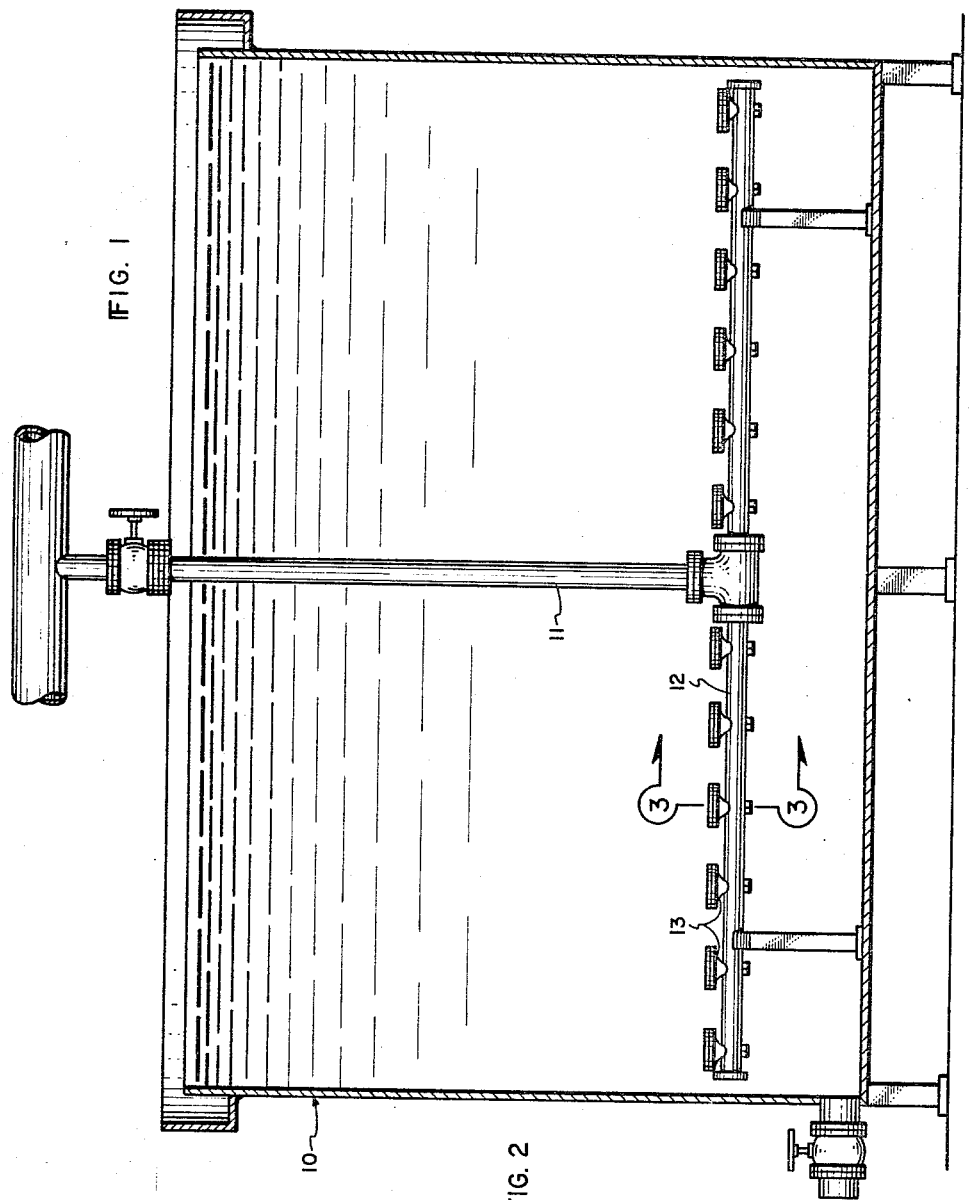
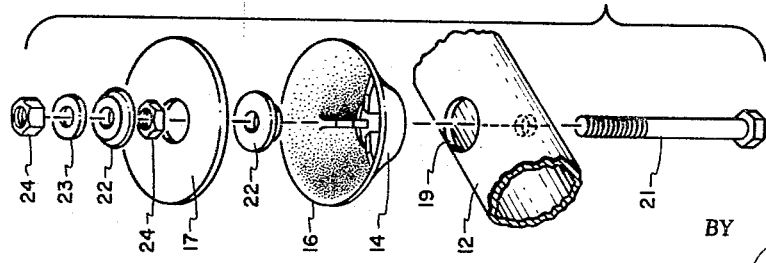
INVENTOR.
LARS G. OLAVSON
BY
Robert R. Finch
ATTORNEY Aug. 8, 1967 L. G. OLAVSON 3,334,819
GAS DIFFUSION APPARATUS Filed March 31, 1966 4 Sheets-Sheet 2

INVENTOR.
LARS G. OLAVSON
BY Robert R. Finch
ATTORNEY

Aug. 8, 1967 L. G. OLAVSON 3,334,819
GAS DIFFUSION APPARATUS
Filed March 31, 1966 4 Sheets-Sheet 3

INVENTOR.
LARS G. OLAVSON
BY Robert A. Finch
ATTORNEY

INVENTOR.
LARS G. OLAVSON
ATTORNEY ated Aug. 8, 1967

United States Patent Office 3,334,819

3,334,819
GAS DIFFUSION APPARATUS
Lars G. Olavson, Salt Lake City, Utah, assignor to The Eimco Corporation, Salt Lake City, Utah, a corporation of Delaware
Filed Mar. 31, 1966, Ser. No. 543,477
1 Claim. (Cl. 239—534)

This application is a continuation in-part of applicant's co-pending application Ser. No. 362,374, filed Apr. 24, 1964, now abandoned.

This invention relates generally to aeration devices and in particular to apparatus for the submerged introduction of air or other gaseous fluids diffusing into a liquid body. By diffusion is meant the rendering of an otherwise undivided air mass into fine bubbles.

It is the primary object of the invention to provide a diffuser capable of receiving pressured air and discharging it into a liquid body as fine, uniformly sized bubbles.

A further object is to provide a diffuser that is readily adjustable to vary the size of the resulting bubbles.

Another object is the provision of a structure attaining the foregoing objects and additionally being capable of sealing against liquid inflow.

An important related object is the provision of a diffuser attaining all of the foregoing objects yet being of a construction low in initial cost and of a design enabling ready assembly and disassembly, installation and removal, and replacement of major components.

An even further object is to provide a diffuser of the type described of a construction enabling it to be mounted rigidly on an air supply manifold or conduit in combination therewith and including means for simultaneously securing the diffuser in place and in assembled form.

Briefly, the diffuser of this invention comprises a rigid hollow body having an inlet, an outlet formed by outwardly flaring body walls, a normally flat resilient bend resistant cover member that is relatively stiff and substantially corresponding in size and shape to the outlet, and fastening means connectable to a central portion of the cover for securing and centering it in place over the outlet with its central portion depressed into the outlet and its surface in contact with the inner wall of the hollow body at least adjacent the periphery of the cover and the outlet.

The cover can be formed from any relatively rigid yet elastic or resilient material such as thin metal, rubber or one of the many available elastomers that are of sufficient strength to be bend-resistant.

In one embodiment, the cover is circular and the hollow body, at least adjacent the outlet or base, takes the form of a circular open-base cone or conoid. In its preferred form, the sidewalls of the cone flare outwardly adjacent the base as in a hyperboloid. In an alternate embodiment, the hollow body is rectangular, having outwardly flared walls, closed by an elongate cover attached along its longitudinal center to the hollow body.

It is important that the connecting means by which the cover is held in place be positioned to insure that the contact pressure between the cover and the flared walls is substantially equal around the entire outlet. For this purpose, the fastening means that holds the cover in sealing engagement also centers the cover with respect to the outwardly flaring walls.

Important features of the various embodiments of the invention are devices and arrangements that permit the adjustability of tension on the outer cover to facilitate even distribution of gaseous bubbles. These various adjustment means, which are described in detail hereinafter, give the inventive device the particular advantage of being adaptable to a wide range of application. Thus, if conditions in the environment in which the diffusers of the invention are used change, the diffusers can be readily adjusted, to meet the new conditions.

Air or other gas is admitted to the hollow body by an inlet provided at any suitable location depending on the use to which the aerator is to be put. In the preferred embodiment the hollow body is open at both the base and the apex and means are provided for securing the body to a pressured air source to communicate therewith through the opening at the apex end.

The aerator of the present invention is capable of embodiment as a complete diffuser for insertion as a unit into an aeration system, or as components for assembly in combination with an air supply chamber or conduit with the assembled combination including the supply conduit and the diffuser. In one form the hollow body and the conduit are a single integral piece.

In order that the invention may be more readily understood and carried into effect, reference is made to the accompanying drawings which are offered by way of example only and not in limitation of the invention, the scope of which is defined by the appended claim rather than by any preceding description.

In the drawings:

FIG. 1 is a side sectional view of a liquid-filled tank embodying an aerator assembly which includes the diffuser of the present invention. In the drawings the diffuser and air supply conduit are shown in elevation for purposes of clarity.

FIG. 2 is an exploded view of the diffuser shown in FIG. 1.

Figure 3:
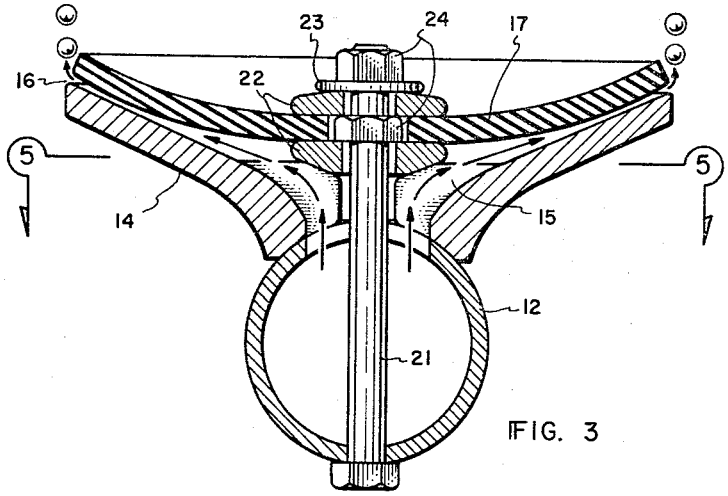
FIG. 3 is a cross-sectional view of the diffuser of FIG. 2 in fully assembled form.

Referring now to FIGS. 1–3, there is shown a liquid filled tank 10 in which is mounted an aeration system comprising a valved conduit 11 formed with a cross or T member 12 serving as a manifold and having mounted thereon a plurality of diffusers 13. Each of the diffusers comprises a hollow body 14 of a form that may best be described as a hyperboloid, open at both ends, with the base forming the outlet and the apex-opening serving as the inlet. It will be noted that the walls flare outwardly to terminate at a circular periphery 16.

A cover 17 of relatively rigid, stiff and non-bending yet resilient material is provided of a size and shape substantially co-extensive with the base outlet. The cover fits over the outlet and is adapted to be pulled downwardly into place with the peripheral surface portions of the cover in face to face contact with the outwardly flared wall adjacent its periphery thereof and the center depressed into the outlet. The conduit or manifold 12 is provided with an opening 19 of a size to mate with the apex opening of the valved body.

The entire assembly is held together and in place by means of a bolt 21 passing through the opposite wall of the conduit 12 thence through the opening 19 upwardly through the apex opening of the body to engage the cover 17 at the center and be fastened thereto by suitable shoulder means such as stiffening washers 22, flat washers 23 and a nut 24. This means of assembly provides particular advantages because only one bolt or other fastening means is required to center the cover in place and attach the diffuser to the conduit.

The bowl or hollow body is secured to conduit 12 by the action of the lower stiffening washer 22 which is drawn tightly against the internal ribs 15 inside the bowl by the adjacent lower nut 24. The cover is held in place independently of the bowl by the upper stiffening washer 22 and upper nut 24. Tension between the cover and the walls of the flared body is adjustable within limits by raising and lowering of the upper nut and stiffener. Advantageously the tension can also be controlled by providing stiffening washers of less or greater thickness, or smaller or larger diameter. Thus, if upper washer 22 is of a larger diameter it will exert more pressure on the outer portion of cover 17, and hold the edges of the cover in tighter sealing relationship with the outwardly flaring walls of the cone. If the thickness of lower stiffening washer 23 is reduced it will cause the entire cover to move closer to the cone, thereby effecting a similar tighter sealing relationship. Thus, a single diffuser assembly can be modified to different uses by simply changing the diameter and/or thickness of the stiffening washers.

As previously noted, it is important that the cover be held in place and centered in such a manner that there is an equal distance from the center to the edges where the air escapes in order to insure uniform tension completely around the escape edge. In the circular structure shown, this is accomplished by the central connection, bolt 21.

Since the cover is always under tension and opens only as pressured air is forced from the manifold 12 outwardly between the cover and the walls, there is no possibility of liquid leaking in. When air is not flowing the cover automatically seats itself and the overlying liquid aids in making the seal even firmer against inward fluid passage. This is illustrated in FIG. 4 where the cover is shown completely seated by water pressure exerted as shown by the downwardly directed arrows.

It is to be noted that the assembly depicted in FIGS. 2, 3, 9 and 10 is such that the diffuser components and the manifold are combined into the same assembly by means of a single bolt.

Figure 4:
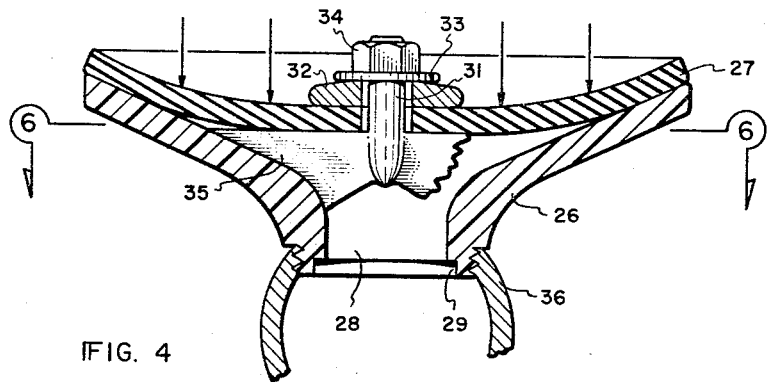
FIG. 4 is a side sectional view of a diffuser embodying the invention and of a construction to be completely self-contained for mounting or dismounting as a unit.
Figure 5:
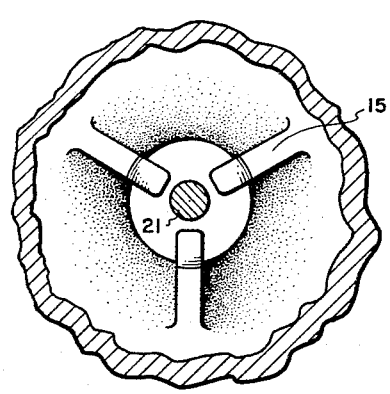
FIG. 5 is a view taken in the plane of line 5—5 of FIG. 3, looking in the direction indicated by the arrows.
Figure 6:
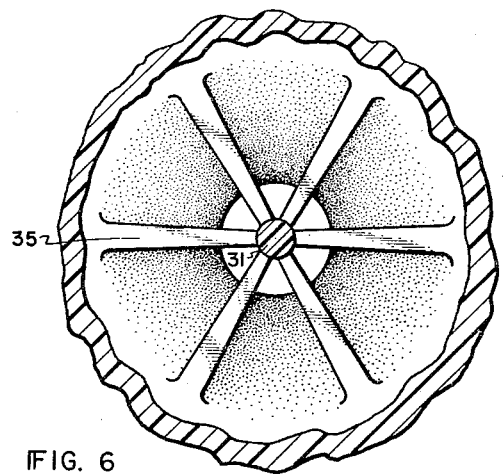
FIG. 6 is a view taken in the plane of line 6—6 of FIG. 4 looking in the direction indicated by the arrows.
Figure 8:
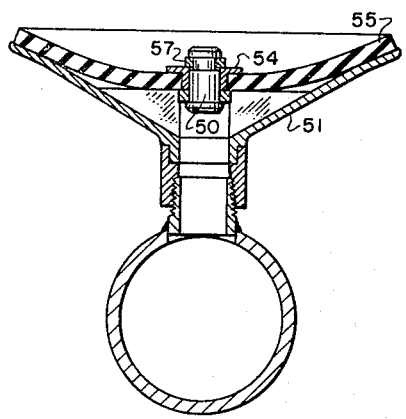
FIG. 8 is a side sectional view of a diffuser of the invention shown attached by threads to a fluid supply conduit.

In FIGS. 4 and 8 a somewhat different modification of the invention is shown in which the diffuser itself is self-contained and adapted to be demountably attached as a unit on a conduit or other fluid pressure source.

The structure of FIG. 4 comprises an open-ended hollow body 26, cast or otherwise formed with integral radially extending ribs 35, a cover 27 and a centrally located cover-securing assembly including a threaded bolt 31 formed integrally with or otherwise fastened to the ribs. The inlet opening 28 is provided with a groove 29 for use as a retainer to hold orifice inserts if desired. The threaded bolt 31 extends from the ribs out the center of the wide end or outlet and has fitted thereover the cover 27, stiffener 32, washer 33 and nut 34. As in the case of the structure of FIGS. 2 and 3, the tension between the cover and the walls is controlled by the degree to which the center of the cover is pulled downwardly into the body.

The entire diffuser is adapted to be mounted as a unit into a wall of a pressure supply conduit such as 36 and this is suitably accomplished simply by threading the small end of the body to fit into a tapped opening in the conduit as shown in FIG. 4. Alternatively, the conduit can be provided with a nipple, over which the hollow body can be threaded as shown in FIG. 8.

Figure 9:
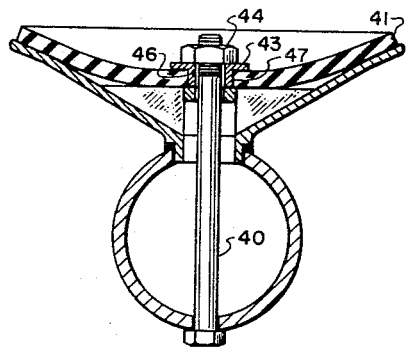
FIG. 9 is a side sectional elevation of a diffuser similar to that shown in FIG. 3, showing an alternate embodiment of the cover fastening means.
Figure 10:
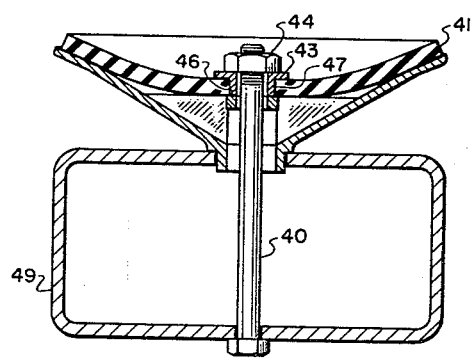
FIG. 10 is a side sectional elevation showing the diffuser of the invention attached to a cross-sectionally rectangular fluid supply conduit.
Figure 11:
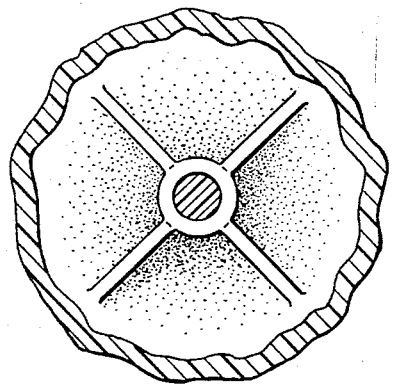
FIG. 11 is a view taken in the plane of line 11—11 of FIG. 7, looking in the direction of the arrows, showing a configuration that is typical for the diffusers of FIGS. 7 through 10.

The assemblies shown in FIGS. 9 and 10 are similar to the one in FIG. 3 in that a single bolt 40 is used to both fasten the diffuser cover 41 to the hollow body 42, and fasten the entire diffuser to the conduit. A shoulder means is provided in these structures by a single stiffening washer 43 located between nut 44 and cover 41. The cover itself rests on radially disposed fluid directing ribs 45. The stiffening washer 43 can be provided with a downwardly extending flange 46 which fits in the opening 47 in cover 41. When the nut 44 is installed on bolt 40 and tightened a self centering action of the cover 41, bolt 40, and stiffening washer 43 is effected. Normally this action will provide accurate centering of the cover 41. However, if extremely accurate centering is required, a bolt 40 of substantially the same size as the inside diameter of the connecting ring 48 which is integrally formed at the inward edges of ribs 45 can be used.

As in the previously described embodiments, the tension of the seal of cover 41 against the outwardly flaring walls of hollow body 42 is controlled by the outside diameter of stiffening washer 43.

The square conduit 49, shown in FIG. 10, provides particular advantages in that a relatively large quantity of air can be supplied to a diffuser, while using a relatively short bolt 40. That is, the bolt is shorter than that required for a round conduit carrying the same volume of air.

Figure 7:
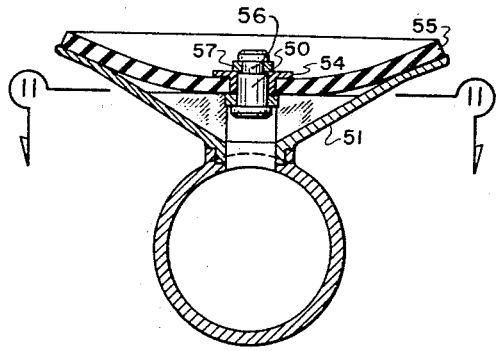
FIG. 7 is a side sectional view of a diffuser integrally united with a gaseous fluid supply conduit in accordance with the invention.
Figure 12:
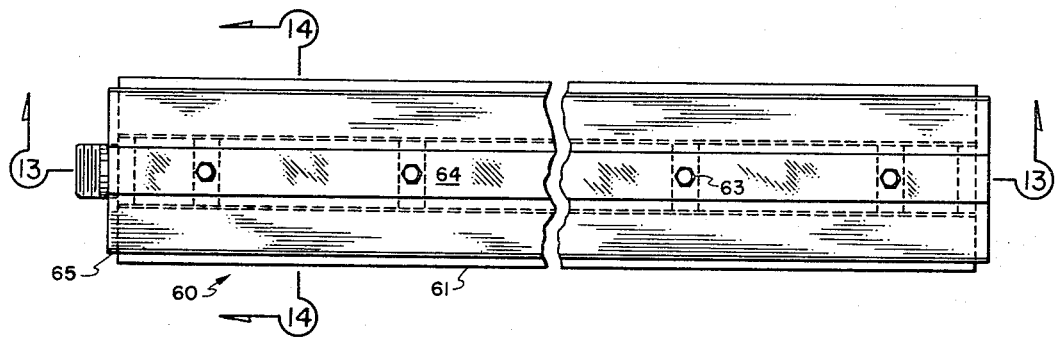
FIG. 12 is a top plan view of a rectangular diffuser embodying the invention.
Figure 13:
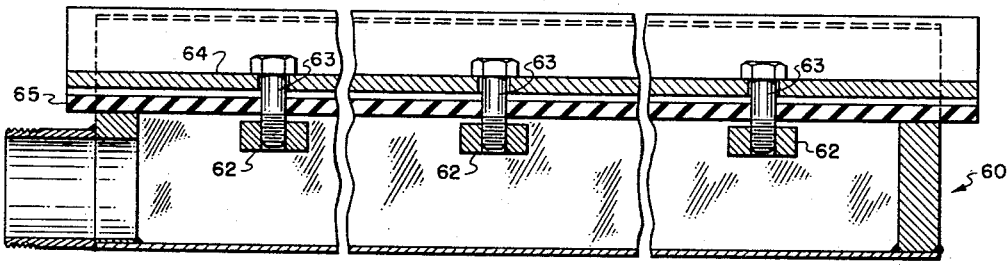
FIG. 13 is a view in side elevation taken through section 13—13 of FIG. 12.
Figure 14:
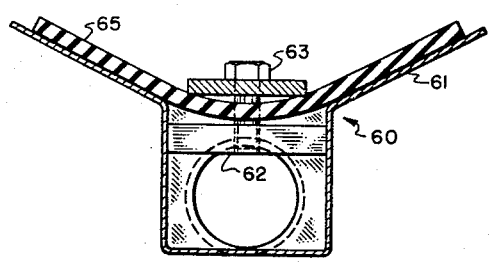
FIG. 14 is a transverse cross-section taken through line 14—14 of FIG. 12.

FIGS. 7 and 8 show diffuser assemblies having cones 51 similar to those of the assemblies depicted in FIGS. 9 and 10. Stud 50 attached to the ribs 52 of cone 53 extends upwardly to center washer 54 and cover 55. A groove 56 in the stud 50 is adapted to receive a clip 57 that snaps into groove 56, thus providing an easily demountable attachment for the cover. The washer 54 in this embodiment provides the main means for increasing or decreasing the tension on the cover 55, by increasing or decreasing the washer diameter. In some respects this embodiment is preferred to those utilizing threaded bolts and nuts, because the problem of properly positioning the nut is eliminated. This is made possible by the discovery that tension on the cover can be effectively varied by simply changing the diameter of the stiffening washer.

Where large quantities of air are required, the diffuser shown in FIGS. 12–14 of elongate rectangular configuration can be used to advantage. The diffuser shown has a hollow body 60, formed with outwardly flaring walls 61. Cross members 62 that extend laterally across the base of the walls are tapped to receive bolts 63 or other fastening means which hold a shoulder means such as elongate bar 64 in position. The tension on cover 65 can be controlled by adjusting the width of bar 64. The primary advantage of the rectangular diffuser is that it can be used where large quantities of air are needed. A single elongate rectangular diffuser of the type described could be used in place of the conduit and multi diffuser assembly shown in FIG. 1.

Although a normally flat cover as described is preferred from the standpoint of cost and ease of use, it is to be understood that other forms may be employed. For instance, the cover may be pre-formed to be normally concave either over its entire area or only in the central portion; and the concavity may face the outlet, or, if the hollow body is sufficiently large, it may face outwardly.

From the foregoing it will be evident that the present invention provides an air diffuser of great versatility and utility that is simple of construction and installation, provides adjustment to increase or decrease the tension between the cover and the body thus to control the size of the bubbles produced, makes use of relatively inexpensive materials and yet provides the necessary seal to prevent the ingress of water into the diffuser and its associated air supply.

Any suitable materials of construction can be employed in the diffuser and both the circular and rectangular designs are adaptable to cast metal or plastic mold construction.

Although the invention has been described with particular reference to aeration equipment, it is obvious that it finds utility in the diffusion of any gaseous fluid.

I claim:

Apparatus for directing a fluid medium into a body of a fluid comprising a container, a manifold mounted in said container below the normal fluid level thereof, a plurality of diffuser elements, each of said diffuser elements comprising a hollow body formed as a circular conoid, said conoid having an open base with a smoothly contoured interior forming a fluid outlet and an open apex end forming a fluid inlet, means attaching said open apex end in fluid communication with the interior of said manifold, valve means for said fluid outlet, said valve means comprising a generally circular member of relatively rigid resilient material and having a diameter substantially equal to the outlet diameter of the conoid, means securing said circular member about the interior surface of the hollow body, said securing means being positioned in the center of the hollow body and engaging the center of the circular member to force the outer periphery of said circular member into fluid tight communication with the smoothly contoured inner surface of the outlet of said conoid and for centering said circular member with respect to the said outlet, the force of said securing means and the resilience of the resilient circular member being so selected that the fluid medium issuing from the manifold deflects the circular member from its seated engagement with the smooth inner surface of the conoid.

References Cited

UNITED STATES PATENTS

| | | | |
|---|---|---|---|
| 2,008,834 | 7/1935 | Marchaut | 239—602 |
| 2,113,615 | 4/1938 | Farmer | 239—570 |
| 2,859,728 | 11/1958 | Hobdy | 239—514 |
| 3,182,978 | 5/1965 | Reilly | 239—534 |

FOREIGN PATENTS 152,886  10/1920  Great Britain.

EVERETT W. KIRBY, *Primary Examiner.*
M. HENSON WOOD, JR., *Examiner.*
R. S. STROBEL, *Assistant Examiner.*